(12) United States Patent
Kim et al.

(10) Patent No.: US 11,708,049 B2
(45) Date of Patent: Jul. 25, 2023

(54) SYSTEMS AND METHODS FOR PREVENTING AN OPERATION OF A CAR APPLICATION THAT REDUCES A QUALITY OF SERVICE OF A COMPUTER SYSTEM OF A VEHICLE

(71) Applicant: Toyota Motor Engineering & Manufacturing North America, Inc., Plano, TX (US)

(72) Inventors: Baekgyu Kim, Mountain View, CA (US); Nejib Ammar, Sunnyvale, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 207 days.

(21) Appl. No.: 17/167,613

(22) Filed: Feb. 4, 2021

(65) Prior Publication Data

US 2022/0126785 A1   Apr. 28, 2022

Related U.S. Application Data

(60) Provisional application No. 63/106,024, filed on Oct. 27, 2020.

(51) Int. Cl.
*B60R 25/01* (2013.01)
*B60R 25/10* (2013.01)

(52) U.S. Cl.
CPC .............. *B60R 25/01* (2013.01); *B60R 25/10* (2013.01)

(58) Field of Classification Search
CPC ..... B60R 25/01; B60R 25/10; G06F 2117/06; G06F 2209/504; G06F 8/65
See application file for complete search history.

(56) References Cited

U.S. PATENT DOCUMENTS

2014/0301196 A1* 10/2014 Blanco .................... H04L 67/61
370/231
2016/0125184 A1    5/2016 Mahaffey et al.
(Continued)

FOREIGN PATENT DOCUMENTS

AU        2010200403 A1    8/2010
CN         111080093 A     4/2020
(Continued)

OTHER PUBLICATIONS

Machine Translation of Xu's reference (CN-111083727-A) (Year: 2020).*

(Continued)

*Primary Examiner* — Tarek Elarabi
(74) *Attorney, Agent, or Firm* — Christopher G. Darrow; Darrow Mustafa PC

(57) ABSTRACT

A method for preventing an operation of a car application that causes a quality of service of an operation of a computer system of a vehicle to be reduced below a threshold can include receiving, from a separate source, a value indicative of the quality of service of the operation of the computer system during the operation of the car application in conjunction with the operation of the computer system. The method can include determining an existence of a condition. The condition can be that the value is less than the threshold. The method can include causing, in response to a determination of a lack of the condition, the car application to be in a condition to be operated on the vehicle. The method can include preventing, in response to a determination of the existence of the condition, the car application from being in the condition to be operated.

20 Claims, 11 Drawing Sheets

(56) References Cited

U.S. PATENT DOCUMENTS

| | | |
|---|---|---|
| 2020/0065087 A1 | 2/2020 | Miura |
| 2020/0107212 A1* | 4/2020 | Zielinski .................. H04W 4/02 |
| 2020/0192782 A1 | 6/2020 | Ding |
| 2021/0184943 A1* | 6/2021 | Jia ..................... H04W 28/0226 |

FOREIGN PATENT DOCUMENTS

| | | | |
|---|---|---|---|
| CN | 111083727 A | * | 4/2020 |
| CN | 111083727 A | | 4/2020 |
| JP | 2001075928 A | | 3/2001 |
| WO | 2020107142 A1 | | 6/2020 |

OTHER PUBLICATIONS

Islam et al., "Accepted or Abandoned? Predicting the Fate of Code Changes," pp. 1-11, Dec. 7, 2019.
Unknown, "Carapp," 5 pages, found at https://en.wikipedia.org/wiki/Car_app (last accessed Oct. 28, 2020).

\* cited by examiner

| CAR APPLICATION | USAGE PERIOD | LOCATION | COMPUTER SYSTEM SOFTWARE | NUMBER OF DISENGAGEMENTS (FAILURES) | QUALITY SCORE (LOWER IS BETTER) |
|---|---|---|---|---|---|
| PEDESTRIAN DETECTION BY GOOGLE | START: 4PM ON 5/12/20 END: 4PM ON 5/15/20 (72 HOURS) | MINNEAPOLIS, MINNESOTA | PRE-COLLISION SYSTEM | 5 | (5/72) x WEIGHT |
| PEDESTRIAN DETECTION BY UBER | START: 4PM ON 5/16/20 END: 10PM ON 5/16/20 (6 HOURS) | GREEN BAY, WISCONSIN | PRE-COLLISION SYSTEM | 1 | (1/6) x WEIGHT |
| LANE DETECTION BY MICROSOFT | START: 4PM ON 5/16/20 END: 10PM ON 5/16/20 (6 HOURS) | GREEN BAY, WISCONSIN | LANE FOLLOWING | 1 | (1/6) x WEIGHT |
| LANE DETECTION BY APPLE | START: 9AM ON 5/17/20 END: 10AM ON 5/17/20 (1 HOUR) | TUCSON, ARIZONA | LANE KEEP ASSIST | 10 | (1/10) x WEIGHT |

WEIGHT SELECTED BY ORIGINAL EQUIPMENT MANUFACTURER OF VEHICLE

FIG. 3

| INTEGRATION INTERFACE | TYPE | EXAMPLE |
|---|---|---|
| HARDWARE INTERFACE | ECU TYPE | DEDICATED PHYSICAL NVIDIA ECU, VIRTUAL ECU |
|  | MEMORY SIZE | 500MB RAM, 100 ROM,... |
| SOFTWARE INTERFACE | OPERATING SYSTEM | LINUX, RTOS, WINDOWS,... |
|  | ALLOWED CONTROL TYPE | SPEED, STEERING, BRAKING,... |
| NETWORK INTERFACE | NETWORK PROTOCOL | DSRC, 5G,... |
|  | MAXIMUM TRANSFER SIZE | 300MB, 1G,... |

FIG. 4

| GEO-LOCATION TYPE | TYPE | EXAMPLE |
|---|---|---|
| POSITION | GPS POSITION, ADDRESS | 44.9782°N, 93.2559°W, 818 SOUTH 2ND STREET, MINNEAPOLIS, MINNESOTA |
| ESTIMATED TIME TO ENTER | TIMESTAMP | 1:30PM 5/12/2020 |
| ESTIMATED TIME TO EXIT | TIMESTAMP | 4:20PM 5/12/2020 |
| LOCAL WEATHER INFORMATION | TEMPERATURE | |
| | VISIBILITY DISTANCE | 100 METERS, 300 METERS,.... |
| | WEATHER EVENT | LIGHT SNOW, HEAVY RAIN, SUNNY,.... |
| ROADWAY REGULATION | ROAD TYPE | HIGHWAY, INTERSECTIONS, CURVY |

FIG. 5

SYSTEMS AND METHODS FOR PREVENTING AN OPERATION OF A CAR APPLICATION THAT REDUCES A QUALITY OF SERVICE OF A COMPUTER SYSTEM OF A VEHICLE

CROSS-REFERENCE TO RELATED APPLICATIONS

This application claims the benefit of U.S. Provisional Application No. 63/106,024, filed Oct. 27, 2020, which is incorporated herein in its entirety by reference.

TECHNICAL FIELD

The disclosed technologies are directed to controlling an operation of a car application. Specifically, the disclosed technologies are directed to preventing an operation of a car application that causes a quality of service of an operation of a computer system of a vehicle to be reduced below a threshold.

BACKGROUND

A car application (car app) can be a type of application software that can be operated on a vehicle to provide the vehicle with a capability that can be in addition to capabilities provided by the computer system of the vehicle. The computer system of the vehicle can have been installed in the vehicle prior to an initial sale of the vehicle. Often the car application can have been produced by an entity (e.g., a third party) different from an entity that manufactured the vehicle (e.g., the original equipment manufacturer (OEM)). The capabilities that can be provided by a car application can be directed to assistance in traffic jams, collision avoidance, assistance with maintaining the vehicle within a specific lane, producing information related to an object detected in a vicinity of the vehicle, navigation, internet-provided alternatives to conventional radio, ride sharing, determining diagnostic information about the vehicle, recording a history of maintenance performed on the vehicle, or the like. Often a car application can be configured to interface with an on-board diagnostic (OBD) adaptor installed on the vehicle, a dashboard camera (dash cam), or the like. Often a car application can be controlled by voice commands.

SUMMARY

In an embodiment, a system for preventing an operation of a car application that causes, during the operation of the car application in conjunction with an operation of a computer system of a vehicle, a quality of service of the operation of the computer system to be reduced below a threshold, can include one or more processors and a memory. The one or more processors can be configured to receive, from a source separate from the vehicle, a value indicative of the quality of service of the operation of the computer system of the vehicle during the operation of the car application in conjunction with the operation of the computer system. The memory can be communicably coupled to the one or more processors. The memory can store a quality of service assessment module and an actuation module. The quality of service assessment module can include instructions that when executed by the one or more processors cause the one or more processors to determine an existence of a first condition, the first condition being that the value is less than the threshold. The actuation module can include instructions that when executed by the one or more processors cause the one or more processors to cause, in response to a determination of a lack of the existence of the first condition, the car application to be in a condition to be operated on the vehicle. The actuation module can include instructions that when executed by the one or more processors cause the one or more processors to prevent, in response to a determination of the existence of the first condition, the car application from being in the condition to be operated on the vehicle.

In another embodiment, a method for preventing an operation of a car application that causes, during the operation of the car application in conjunction with an operation of a computer system of a vehicle, a quality of service of the operation of the computer system to be reduced below a threshold can include receiving, by a processor and from a source separate from the vehicle, a value indicative of the quality of service of the operation of the computer system of the vehicle during the operation of the car application in conjunction with the operation of the computer system. The method can include determining, by the processor, an existence of a first condition, the first condition being that the value is less than the threshold. The method can include causing, by the processor and in response to a determination of a lack of the existence of the first condition, the car application to be in a condition to be operated on the vehicle. The method can include preventing, by the processor and in response to a determination of the existence of the first condition, the car application from being in the condition to be operated on the vehicle.

In another embodiment, a non-transitory computer-readable medium for preventing an operation of a car application that causes, during the operation of the car application in conjunction with an operation of a computer system of a vehicle, a quality of service of the operation of the computer system to be reduced below a threshold can include instructions that when executed by one or more processors cause the one or more processors to receive, from a source separate from the vehicle, a value indicative of the quality of service of the operation of the computer system of the vehicle during the operation of the car application in conjunction with the operation of the computer system. The non-transitory computer-readable medium can include instructions that when executed by the one or more processors cause the one or more processors to determine, an existence of a condition. The condition can be that the value is less than the threshold. The non-transitory computer-readable medium can include instructions that when executed by the one or more processors cause the one or more processors to cause, in response to a determination of a lack of the existence of the condition, the car application to be in a condition to be operated on the vehicle. The non-transitory computer-readable medium can include instructions that when executed by the one or more processors cause the one or more processors to prevent, in response to a determination of the existence of the condition, the car application from being in the condition to be operated on the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3 is a table that illustrates examples of calculations of values indicative of qualities of service of operations of computer systems of vehicles during operations of car applications in conjunction with the operations of the computer systems, according to the disclosed technologies.

FIG. 4 is a table that illustrates examples of information about the interface of the computer system of the vehicle, according to the disclosed technologies.

FIG. 5 is a table that illustrates examples of values associated with characteristics of the location of the vehicle, according to the disclosed technologies.

DETAILED DESCRIPTION

Often a car application can be configured to operate in conjunction with an operation of a computer system of a vehicle that was installed in the vehicle prior to an initial sale of the vehicle. At least because the computer system can be configured to control an operation of the vehicle that effects a safety of the vehicle, there can be a concern about whether an operation of the car application in conjunction with the operation of the computer system reduces a quality of service of the operation of the computer system below a threshold.

The disclosed technologies can be used to prevent an operation of a car application that causes, during the operation of the car application in conjunction with an operation of a computer system of a vehicle, a quality of service of the operation of the computer system to be reduced below a threshold. A value indicative of the quality of service of the operation of the computer system of the vehicle during the operation of the car application in conjunction with the operation of the computer system can be received from a source separate from the vehicle. An existence of a condition can be determined. The condition can be that the value is less than the threshold. In response to a determination of a lack of the existence of the condition, the car application can be caused to be in a condition to be operated on the vehicle. In response to a determination of the existence of the condition, the car application can be prevented from being in the condition to be operated on the vehicle.

Figure 1:
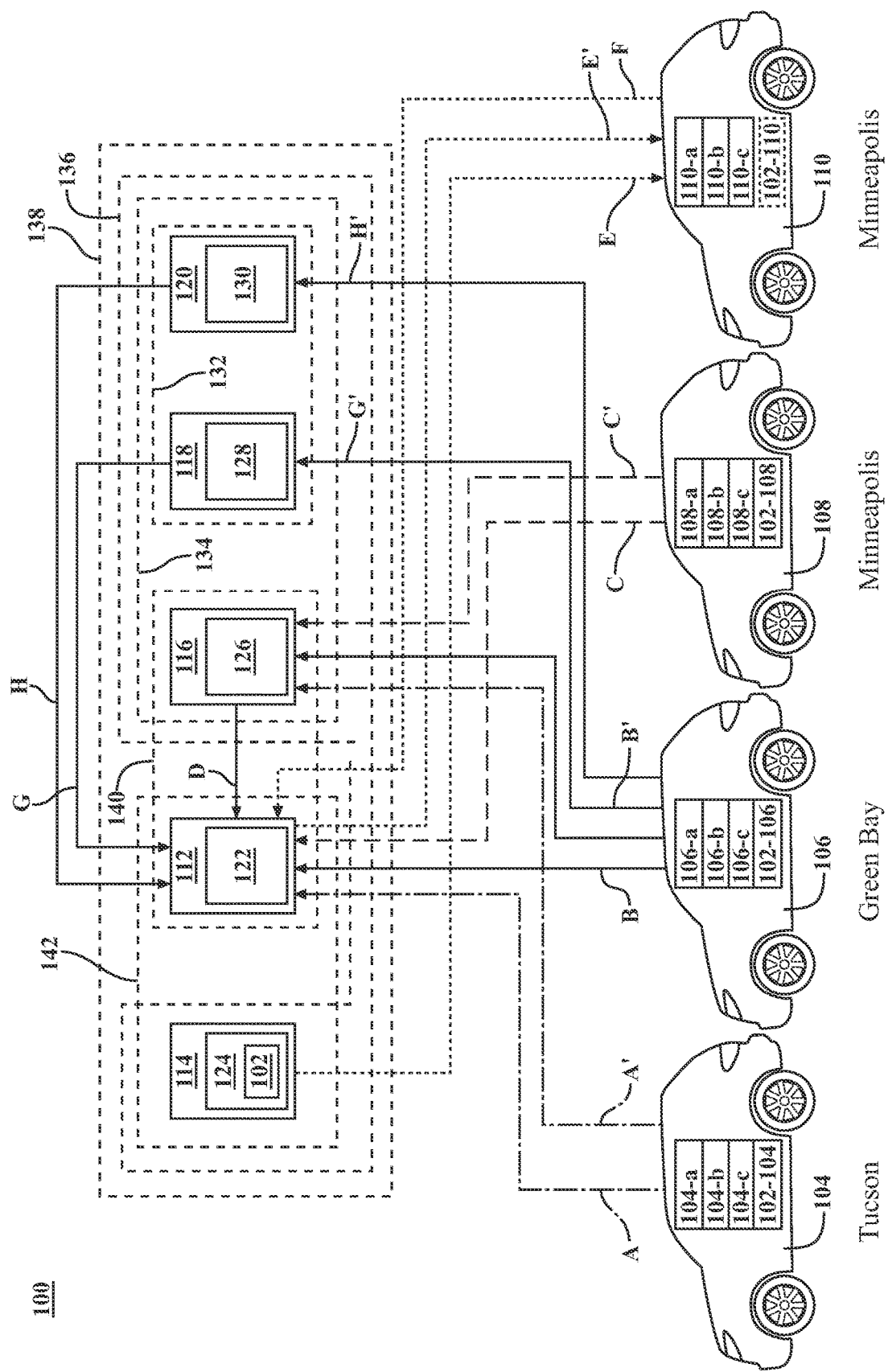
FIG. 1 is a diagram that includes an example of an environment in which an operation of a car application can be controlled, according to the disclosed technologies.

FIG. 1 is a diagram that includes an example of an environment 100 in which an operation of a car application 102 can be controlled, according to the disclosed technologies. For example, the environment 100 can include a vehicle 104, a vehicle 106, a vehicle 108, a vehicle 110, a cloud computing platform 112, a cloud computing platform 114, a cloud computing platform 116, a cloud computing platform 118, and a cloud computing platform 120.

For example, the vehicle 104 can be located in Tucson, Ariz., and can have a computer system 104-a, a wireless communications device 104-b, a camera 104-c, and a copy of the car application 102-104. For example, the vehicle 106 can be located in Green Bay, Wis., and can have a computer system 106-a, a wireless communications device 106-b, a camera 106-c, and a copy of the car application 102-106. For example, the vehicle 108 can be located in Minneapolis, Minn., and can have a computer system 108-a, a wireless communications device 108-b, a camera 108-c, and a copy of the car application 102-108. For example, the vehicle 110 can be located in Minneapolis, Minn., and can have a computer system 110-a, a wireless communications device 110-b, and a camera 110-c. In a variation, the vehicle 110 can have a copy of the car application 102-110.

For example, the cloud computing platform 112 can include a system 122 for preventing an operation of the car application 102 that causes, during the operation of the car application 102 in conjunction with an operation of a computer system of a vehicle, a quality of service of the operation of the computer system to be reduced below a threshold. For example, the cloud computing platform 114 can include a car application database 124. For example, the car application database 124 can have a copy of the car application 102. For example, the cloud computing platform 116 can include a quality of service report database 126. For example, the cloud computing platform 118 can include a road information database 128. For example, the cloud computing platform 120 can include a road images database 130.

In an implementation, the cloud computing platform 118 and the cloud computing platform 120 can be combined in a cloud computing platform 132. In an implementation, the cloud computing platform 116, the cloud computing platform 118, and the cloud computing platform 120 can be combined in a cloud computing platform 134. In an implementation, the cloud computing platform 114, the cloud computing platform 116, the cloud computing platform 118, and the cloud computing platform 120 can be combined in a cloud computing platform 136. In an implementation, the cloud computing platform 112, the cloud computing platform 114, the cloud computing platform 116, the cloud computing platform 118, and the cloud computing platform 120 can be combined in a cloud computing platform 138. In an implementation, the cloud computing platform 112 and the cloud computing platform 116 can be combined in a cloud computing platform 140. In an implementation, the cloud computing platform 112 and the cloud computing platform 114 can be combined in a cloud computing platform 142.

Figure 2:
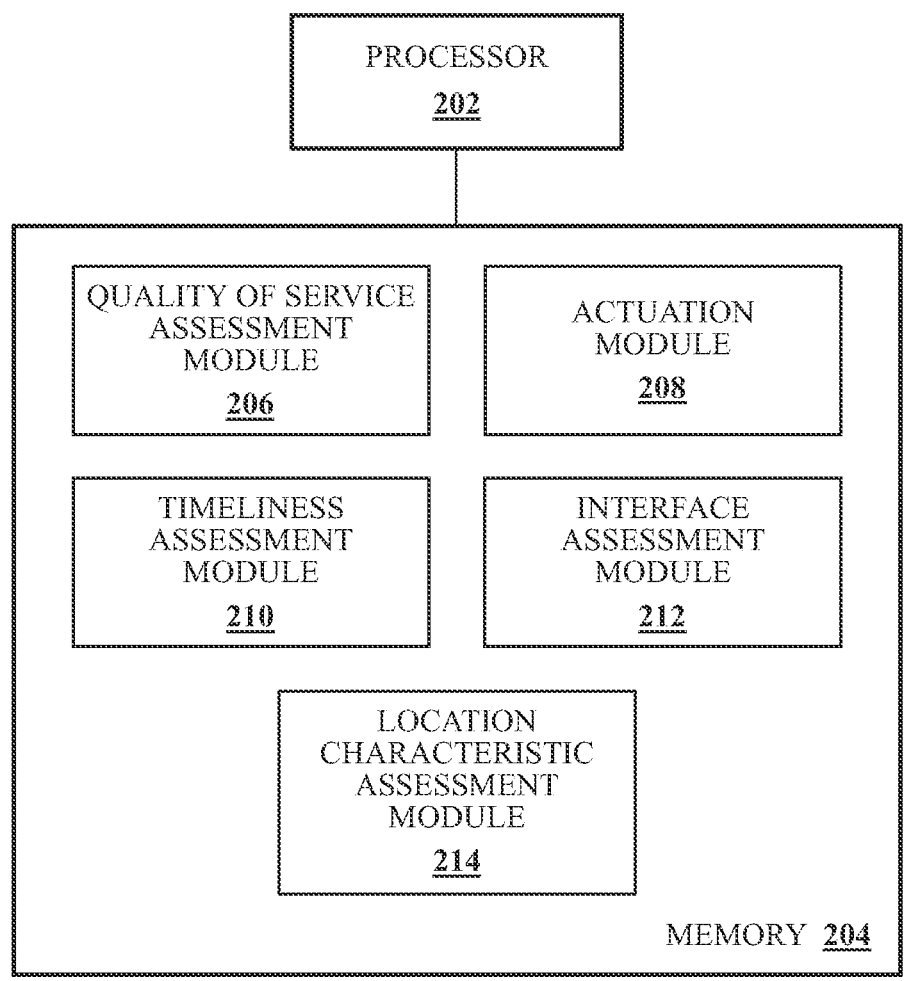
FIG. 2 is a block diagram that illustrates an example of a system for preventing an operation of a car application that causes a quality of service of an operation of a computer system of a vehicle to be reduced below a threshold, according to the disclosed technologies.

FIG. 2 is a block diagram that illustrates an example of a system 200 for preventing an operation of a car application that causes a quality of service of an operation of a computer system of a vehicle to be reduced below a threshold, according to the disclosed technologies. For example, with reference to FIG. 1, the system 200 can be the system 122 and the car application can be the car application 102.

Returning to FIG. 2, the system 200 can include, for example, a processor 202 and a memory 204. The memory 204 can be communicably coupled to the processor 202. For example, the memory 204 can store a quality of service assessment module 206 and an actuation module 208.

The processor 202 can be configured to receive, from a source separate from the vehicle, a value indicative of the quality of service of the operation of the computer system of the vehicle during the operation of the car application in conjunction with the operation of the computer system. FIG. 3 is a table 300 that illustrates examples of calculations of values indicative of qualities of service of operations of computer systems of vehicles during operations of car applications in conjunction with the operations of the computer systems, according to the disclosed technologies.

For example, with reference to FIG. 1, the vehicle can be the vehicle 110. For example, the source separate from the vehicle can include one or more of a different vehicle or a first cloud computing platform. For example, the source separate from the vehicle can include one or more of the vehicle 104 (A), the vehicle 106 (B), or the vehicle 108 (C), or the cloud computing platform 116 (D) (e.g., previously, one or more of the vehicle 104 (A'), the vehicle 106 (B'), or the vehicle 108 (C') can have sent one or more values to the quality of service report database 126 included in the cloud computing platform 116). For example, the different vehicle be of a similar make and model as the vehicle. For example, the computing system of the different vehicle can be similar to the computing system of the vehicle. Returning to FIG. 2, for example, the processor 202 can be disposed in one of a second cloud computing platform or the first cloud computing platform. For example, with reference to FIG. 1, the second cloud computing platform can be the cloud computing platform 112 or the first cloud computing platform can be the cloud computing platform 140 or the cloud computing platform 138.

For example, the car application can be configured to produce information related to an object detected in a vicinity of the vehicle. For example, the object can include a dynamic object in motion in the vicinity of the vehicle (e.g., another vehicle, a pedestrian, a bicyclist, or the like). For example, the object can include a static object associated with information relevant to an operation of the vehicle (e.g., a traffic light, a traffic sign, a road sign, a road surface marking (e.g., a lane marking), or the like).

For example, the computer system can have been installed in the vehicle prior to an initial sale of the vehicle. For example, the computer system can have been installed by an entity that manufactured the vehicle (e.g., the original equipment manufacturer (OEM)). For example, the computer system can be configured to control an operation of the vehicle that effects a safety of the vehicle (e.g., automatic braking software, lane-changing software, or the like).

Returning to FIG. 2, the quality of service assessment module 206 can include instructions that function to control the processor 202 to determine an existence of a first condition. The first condition can be that the value is less than the threshold (the value being indicative of the quality of service of the operation of the computer system of the vehicle during the operation of the car application in conjunction with the operation of the computer system).

The actuation module 208 can include instructions that function to control the processor 202 to cause, in response to a determination of a lack of the existence of the first condition, the car application to be in a condition to be operated on the vehicle. For example, the instructions of the actuation module 208 can cause the processor 202 to one or more of cause the car application to be downloaded to the vehicle (e.g., a first variation) or transmit, to the vehicle, a signal that is configured to cause the car application to be in the condition to be operated on the vehicle (e.g., a second variation).

For example, in the first variation, the instructions of the actuation module 208 can cause the processor 202 to cause the car application to be downloaded from a first cloud computing platform to the vehicle. For example, the processor 202 can be disposed in one of a second cloud computing platform or the first cloud computing platform. For example, with reference to FIG. 1, the system 122 included in the cloud computing platform 112 can cause the car application database 124 included in the cloud computing platform 114 to cause the car application 102 to be downloaded (E) to the vehicle 110. Alternatively, the first cloud computing platform can be the cloud computing platform 142 or the cloud computing platform 138.

Returning to FIG. 2, for example, in the second variation, the car application can have been installed in the vehicle at a time earlier than a time at which the instructions of the actuation module 208 caused the processor 202 to cause the car application to be in the condition to be operated on the vehicle. For example, with reference to FIG. 1, the copy of the car application 102-110 can have been installed in the vehicle 110 at a time earlier than a time at which the system 122 included in the cloud computing platform 112 caused the signal (E') to be transmitted to the vehicle 110 to cause the copy of the car application 102-110 to be in the condition to be operated on the vehicle 110.

Returning to FIG. 2, additionally, the actuation module 208 can include instructions that function to control the processor 202 to prevent, in response to a determination of the existence of the first condition, the car application from being in the condition to be operated on the vehicle. For example, the instructions of the actuation module 208 can cause the processor 202 to one or more of prevent the car application from being downloaded to the vehicle (e.g., the first variation) or prevent a transmission, to the vehicle, of the signal that is configured to cause the car application to be in the condition to be operated on the vehicle (e.g., the second variation). Additionally, for example, the instructions of the actuation module 208 can further cause the processor 202 to cause, in response to the determination of the existence of the first condition, a warning signal to be transmitted to one or more of the vehicle or an electronic device of an operator of the vehicle.

In a first implementation, the processor 202 can be further configured to receive, from another source separate from the vehicle, another value indicative of the quality of service of the operation of the computer system of the vehicle during the operation of the car application in conjunction with the operation of the computer system. For example, with reference to FIG. 1, the source separate from the vehicle can be the vehicle 106 (B) and the other source separate from the vehicle can be the vehicle 108 (C). Returning to FIG. 2, the memory 204 can further store a timeliness assessment module 210. The timeliness assessment module 210 can include instructions that function to control the processor 202 to determine that the value indicative of the quality of service of the operation of the computer system of the vehicle during the operation of the car application in conjunction with the operation of the computer system was produced at a time later than another time at which the other value indicative of the quality of service of the operation of the computer system of the vehicle during the operation of the car application in conjunction with the operation of the computer system was produced. For example, with reference to FIG. 1, the value (B) indicative of the quality of service of the operation of the computer system of the vehicle during the operation of the car application in conjunction with the operation of the computer system can have been produced at a time later than another time at which the other value (C) indicative of the quality of service of the operation of the computer system of the vehicle during the operation of the car application in conjunction with the operation of the computer system was produced.

Returning to FIG. 2, in a second implementation, the processor 202 can be further configured to receive, from the vehicle, a request. The request can be for one or more of the car application (e.g., a first variation of the second implementation) or for a signal to cause the car application to be in the condition to be operated on the vehicle (e.g., a second variation of the second implementation). For example, with reference to FIG. 1, the system 122 can be configured to receive, from the vehicle 110, the request (F).

Returning to FIG. 2, in a specific realization of the second implementation, the memory 204 can further store an interface assessment module 212. The interface assessment module 212 can include instructions that function to control the processor 202 to determine an existence of a second condition. The second condition can be that an interface of the computer system of the vehicle supports the operation of the car application. For example, the interface of the computer system can be an interface of the computer system installed at a time earlier than a current interface of the computer system. That is, if the current interface of the computer system does not support the operation of the car application, then the second condition can exist if an interface installed at a time earlier than the current interface supports the operation of the car application (i.e., backward compatibility).

For example, in this specific realization of the second implementation, the request can include information about the interface of the computer system of the vehicle. FIG. 4 is a table 400 that illustrates examples of information about the interface of the computer system of the vehicle, according to the disclosed technologies.

Returning to FIG. 2, in this specific realization of the second implementation, the instructions of the actuation module 208 can cause the processor 202 to cause, in response to the determination of the lack of the existence of the first condition and a determination of the existence of the second condition, the car application to be in the condition to be operated on the vehicle. Additionally, in this specific realization, the instructions of the actuation module 208 can cause the processor 202 to prevent, in response to one or more of the determination of the existence of the first condition or a determination of a lack of the existence of the second condition, the car application from being in the condition to be operated on the vehicle.

In a variation of this specific realization of the second implementation, the memory 204 can further store a location characteristic assessment module 214. The location characteristic assessment module 214 can include instructions that function to control the processor 202 to determine that a value associated with a characteristic of a location of the source separate from the vehicle is within a threshold value of a value associated with the characteristic of the location of the vehicle. Sometimes a car application can have been designed to perform optimally when a value associated with a characteristic of an environment has a relationship with a specific threshold or is with a specific range of values. For example, a car application associated with lane markings on a road may have been designed to perform optimally when a contrast between a color of the lane markings and a color of the road is greater than a specific threshold. Often such a characteristic can be associated with a location. For example, a car application associated with dynamic object detection may have been designed to perform optimally in an environment that experiences frequent snowfall. That is, for a specific car application, the value indicative of the quality of service of the operation of the computer system of the vehicle during the operation of the specific car application in conjunction with the operation of the computer system can be a function of the value associated with the characteristic. For example, the characteristic can be associated with one or more of a position, a weather history, a condition of a road surface marking, a type of a road (e.g., a highway), a regulation associated with the road, a speed limit associated with the regulation, a limitation on a direction of travel on the road associated with the regulation, a setting of the road (e.g., urban or rural), an intersection of the road with another road, a degree of curvature associated with the road, a measure produced from processing an image of the road, an availability of a type of communications, or the like.

For example, in this variation of this specific realization of the second implementation, the request can further include the value associated with the characteristic of the location of the vehicle. FIG. 5 is a table 500 that illustrates examples of values associated with characteristics of the location of the vehicle, according to the disclosed technologies.

Returning to FIG. 2, in a specific configuration of this variation of this specific realization of the second implementation, the instructions of the location characteristic assessment module 214 can cause the processor 202 to determine an existence of a third condition. The third condition can be that a value that defines a position of the location of the source separate from the vehicle is within a threshold distance of a value that defines the position of the location of the vehicle.

For example, with reference to FIG. 1, if the vehicle is the vehicle 110, located in Minneapolis, and the source separate from the vehicle is the vehicle 108, located in Minneapolis, then the value that defines the position of the location of the source separate from the vehicle may be within the threshold distance of the value that defines the position of the location of the vehicle.

Returning to FIG. 2, additionally, in this specific configuration of this variation of this specific realization of the second implementation, the instructions of the location characteristic assessment module 214 can cause the processor 202 to determine, in response to a determination of a lack of the existence of the third condition, an existence of a fourth condition. The fourth condition can be that a value associated with a first characteristic of the location of the source separate from the vehicle is within a first threshold value of a value associated with the first characteristic of the location of the vehicle. For example, the first characteristic can be a weather history.

For example, with reference to FIG. 1, if the vehicle is the vehicle 110, located in Minneapolis, and the source separate from the vehicle is the vehicle 106, located in Green Bay, then the value associated with the weather history of the location of the vehicle 106 (i.e., Green Bay) may be within the first threshold value of the value associated with the weather history of the location of the vehicle 110 (i.e., Minneapolis). Conversely, if the vehicle is the vehicle 110, located in Minneapolis, and the source separate from the vehicle is the vehicle 104, located in Tucson, then the value associated with the weather history of the location of the vehicle 104 (i.e., Tucson) may not be within the first threshold value of the value associated with the weather history of the location of the vehicle 110 (i.e., Minneapolis).

Returning to FIG. 2, additionally, in this specific configuration of this variation of this specific realization of the second implementation, the instructions of the location characteristic assessment module 214 can cause the processor 202 to determine, in response to a determination of the existence of the fourth condition, an existence of a fifth condition. The fifth condition can be that a value associated with a second characteristic of the location of the source separate from the vehicle is within a second threshold value of a value associated with the second characteristic of the location of the vehicle. For example, the second characteristic can be one or more of a type of a road (e.g., a highway), a regulation associated with the road, a speed limit associated with the regulation, a limitation on a direction of travel on the road associated with the regulation, a setting of the road (e.g., urban or rural), an intersection of the road with another road, a degree of curvature associated with the road, or the like. For example, the second characteristic can be a speed limit associated with a regulation associated with the road.

For example, with reference to FIG. 1, if the vehicle is the vehicle 110, located in Minneapolis on a road with a speed limit greater than 40 miles per hour, and the source separate from the vehicle is the vehicle 106, located in Green Bay on a road with a speed limit greater than 40 miles per hour, then the value associated with the road having the speed limit greater than 40 miles per hour at the location of the vehicle 106 (i.e., Green Bay) may be within the second threshold value of the value associated with the road having the speed limit greater than 40 miles per hour at the location of the vehicle 110 (i.e., Minneapolis). Additionally or alternatively, the source separate from the vehicle can be the cloud computing platform 118 (G) (e.g. previously, one or more of the vehicle 106 (G') or another entity (e.g., a government entity, a roadside infrastructure unit, or the like) can have sent the value associated with the road having the speed limit greater than 40 miles per hour to the road information database 128 included in the cloud computing platform 118).

Returning to FIG. 2, additionally, in this specific configuration of this variation of this specific realization of the second implementation, the instructions of the location characteristic assessment module 214 can cause the processor 202 to determine, in response to a determination of the existence of the fifth condition, an existence of a sixth condition. The sixth condition can be that a value associated with a third characteristic of the location of the source separate from the vehicle is within a third threshold value of a value associated with the third characteristic of the location of the vehicle. For example, the third characteristic can be a measure produced from processing an image of a road. For example, if the car application is associated with lane markings on a road and the car application has been designed to perform optimally when a contrast between a color of the lane markings and a color of the road is greater than a specific threshold, then a measure produced from processing an image of the road can be indicative whether or not the contrast between the color of the lane markings and the color of the road is greater than the specific threshold.

For example, with reference to FIG. 1, if the vehicle is the vehicle 110, located in Minneapolis on a road in which a measure produced from processing an image of the road is indicative that the contrast between the color of the lane markings and the color of the road is greater than the specific threshold, and the source separate from the vehicle is the vehicle 106, located in Green Bay on a road in which a measure produced from processing an image of the road is indicative that the contrast between the color of the lane markings and the color of the road is greater than the specific threshold, then the measure produced from processing the image of the road at the location of the vehicle 106 (i.e., Green Bay) may be within the third threshold value of the measure produced from processing the image of the road at the location of the vehicle 110 (i.e., Minneapolis). Additionally or alternatively, the source separate from the vehicle can be the cloud computing platform 120 (H) (e.g. previously, one or more of the vehicle 106 (H') or another entity (e.g., a government entity, a roadside infrastructure unit, or the like) can have sent the image of the road or the measure produced from processing the image of the road to the road images database 130 included in the cloud computing platform 120).

Figure 6A:
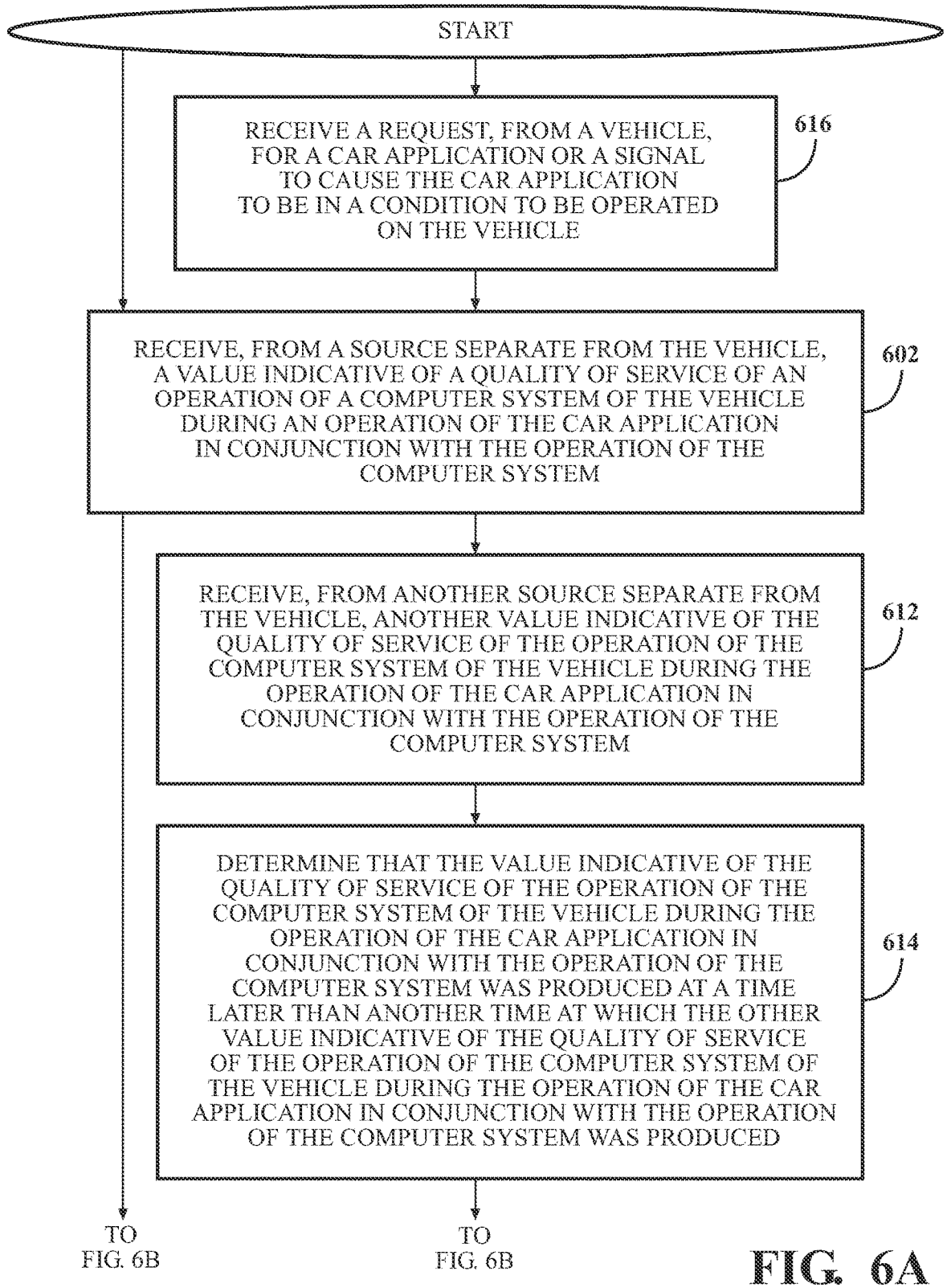
FIGS. 6A through 6C include a flow diagram that illustrates an example of a method that is associated with preventing an operation of a car application that causes a quality of service of an operation of a computer system of a vehicle to be reduced below a threshold, according to the disclosed technologies.
Figure 6B:
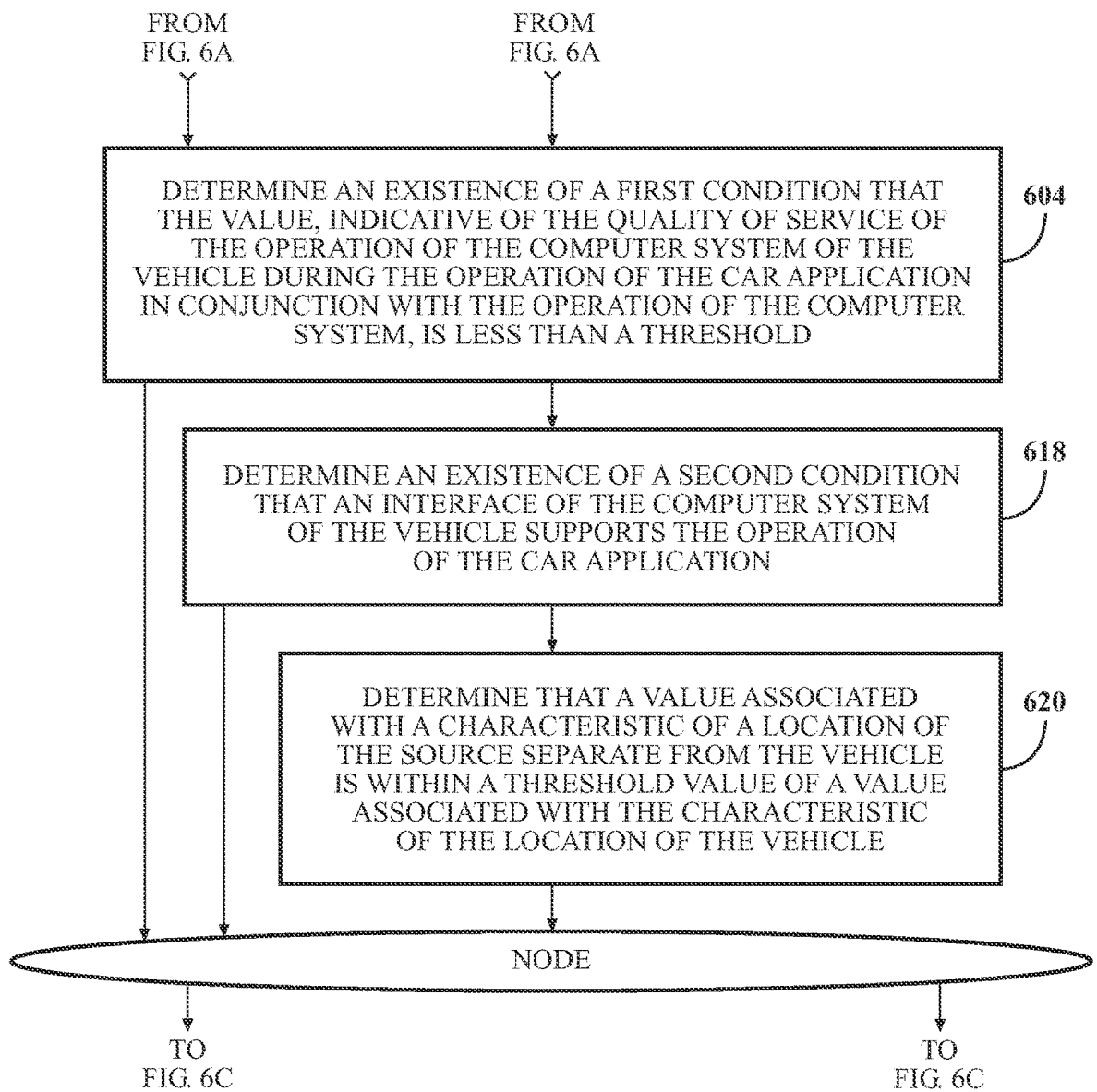
Figure 6C:
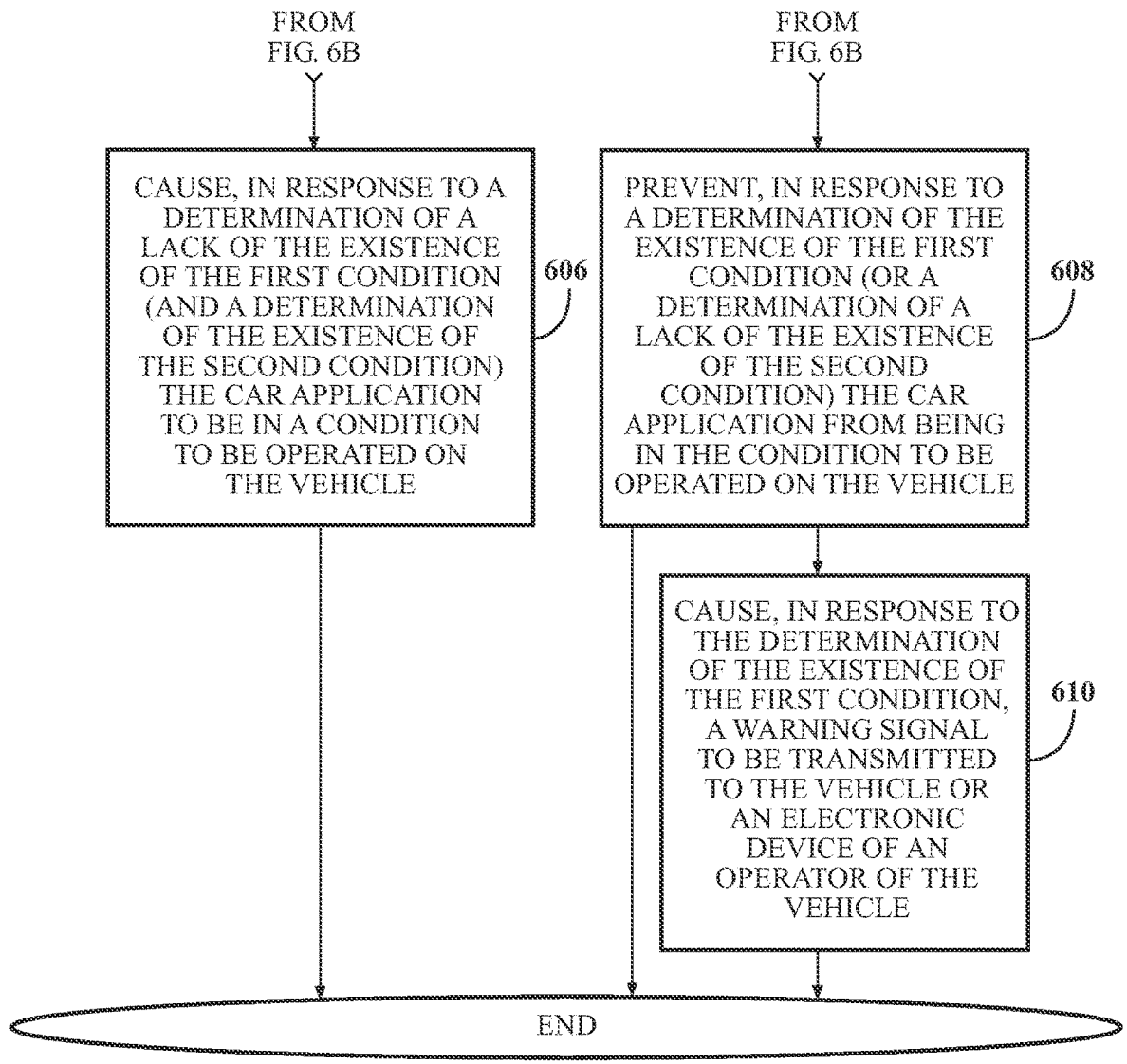

FIGS. 6A through 6C include a flow diagram that illustrates an example of a method 600 that is associated with preventing an operation of a car application that causes a quality of service of an operation of a computer system of a vehicle to be reduced below a threshold, according to the disclosed technologies. The method 600 is described from the perspective of the system 200 illustrated in FIG. 2. Although the method 600 is described in combination with the system 200, one of skill in the art understands, in light of the description herein, that the method 600 is not limited to being implemented by the system 200. Rather, the system 200 is an example of a system that may be used to implement the method 600.

In FIG. 6A, in the method 600, at an operation 602, the processor 202 can receive, from a source separate from the vehicle, a value indicative of the quality of service of the operation of the computer system of the vehicle during the operation of the car application in conjunction with the operation of the computer system. For example, the source separate from the vehicle can include one or more of a different vehicle or a first cloud computing platform. For example, the car application can be configured to produce information related to an object detected in a vicinity of the vehicle. For example, the object can include a dynamic object in motion in the vicinity of the vehicle (e.g., another vehicle, a pedestrian, a bicyclist, or the like). For example, the object can include a static object associated with information relevant to an operation of the vehicle (e.g., a traffic light, a traffic sign, a road sign, a road surface marking (e.g., a lane marking), or the like). For example, the computer system can have been installed in the vehicle prior to an initial sale of the vehicle. For example, the computer system can have been installed by an entity that manufactured the vehicle (e.g., the original equipment manufacturer (OEM)). For example, the computer system can be configured to control an operation of the vehicle that effects a safety of the vehicle (e.g., automatic braking software, lane-changing software, or the like).

In FIG. 6B, in the method 600, at an operation 604, the quality of service assessment module 206 can determine an existence of a first condition. The first condition can be that the value is less than the threshold (the value being indicative of the quality of service of the operation of the computer system of the vehicle during the operation of the car application in conjunction with the operation of the computer system).

In FIG. 6C, in the method 600, at an operation 606, the actuation module 208 can cause, in response to a determination of a lack of the existence of the first condition, the car application to be in a condition to be operated on the vehicle. For example, the actuation module 208 can one or more of cause the car application to be downloaded to the vehicle (e.g., a first variation) or transmit, to the vehicle, a signal that is configured to cause the car application to be in the condition to be operated on the vehicle (e.g., a second variation). For example, in the first variation, the actuation module 208 can cause the car application to be downloaded from a first cloud computing platform to the vehicle. For example, the processor 202 can be disposed in one of a second cloud computing platform or the first cloud computing platform. For example, in the second variation, the car application can have been installed in the vehicle at a time earlier than a time at which the actuation module 208 caused the car application to be in the condition to be operated on the vehicle.

At an operation 608, the actuation module 208 can prevent, in response to a determination of the existence of the first condition, the car application from being in the condition to be operated on the vehicle. For example, the actuation module 208 can one or more of prevent the car application from being downloaded to the vehicle (e.g., the first variation) or prevent a transmission, to the vehicle, of the signal that is configured to cause the car application to be in the condition to be operated on the vehicle (e.g., the second variation).

Additionally, at an operation 610, the actuation module 208 can cause, in response to the determination of the existence of the first condition, a warning signal to be transmitted to one or more of the vehicle or an electronic device of an operator of the vehicle.

In FIG. 6A, in the method 600, in a first implementation, at an operation 612, the processor 202 can receive, from another source separate from the vehicle, another value indicative of the quality of service of the operation of the computer system of the vehicle during the operation of the car application in conjunction with the operation of the computer system.

In the first implementation, at an operation 614, the timeliness assessment module 210 can determine that the value indicative of the quality of service of the operation of the computer system of the vehicle during the operation of the car application in conjunction with the operation of the computer system was produced at a time later than another time at which the other value indicative of the quality of service of the operation of the computer system of the vehicle during the operation of the car application in conjunction with the operation of the computer system was produced.

In a second implementation, at an operation 616, the processor 202 can receive, from the vehicle, a request. The request can be for one or more of the car application (e.g., a first variation of the second implementation) or for a signal to cause the car application to be in the condition to be operated on the vehicle (e.g., a second variation of the second implementation).

In FIG. 6B, in the method 600, in a specific realization of the second implementation, at an operation 618, the interface assessment module 212 can determine an existence of a second condition. The second condition can be that an interface of the computer system of the vehicle supports the operation of the car application. For example, the interface of the computer system can be an interface of the computer system installed at a time earlier than a current interface of the computer system. That is, if the current interface of the computer system does not support the operation of the car application, then the second condition can exist if an interface installed at a time earlier than the current interface supports the operation of the car application (i.e., backward compatibility). For example, in this specific realization of the second implementation, at the operation 616, the request can include information about the interface of the computer system of the vehicle.

In this specific realization of the second implementation, at the operation 606, the actuation module 208 can cause, in response to the determination of the lack of the existence of the first condition and a determination of the existence of the second condition, the car application to be in the condition to be operated on the vehicle. Additionally, in this specific realization, at the operation 608, the actuation module 208 can prevent, in response to one or more of the determination of the existence of the first condition or a determination of a lack of the existence of the second condition, the car application from being in the condition to be operated on the vehicle.

In a variation of this specific realization of the second implementation, at an operation 620, the location characteristic assessment module 214 can determine that a value associated with a characteristic of a location of the source separate from the vehicle is within a threshold value of a value associated with the characteristic of the location of the vehicle. For example, the characteristic can be associated with one or more of a position, a weather history, a condition of a road surface marking, a type of a road (e.g., a highway), a regulation associated with the road, a speed limit associated with the regulation, a limitation on a direction of travel on the road associated with the regulation, a setting of the road (e.g., urban or rural), an intersection of the road with another road, a degree of curvature associated with the road, a measure produced from processing an image of the road, an availability of a type of communications, or the like. For example, in this variation of this specific realization of the second implementation, at the operation 616, the request can further include the value associated with the characteristic of the location of the vehicle.

Figure 7A:
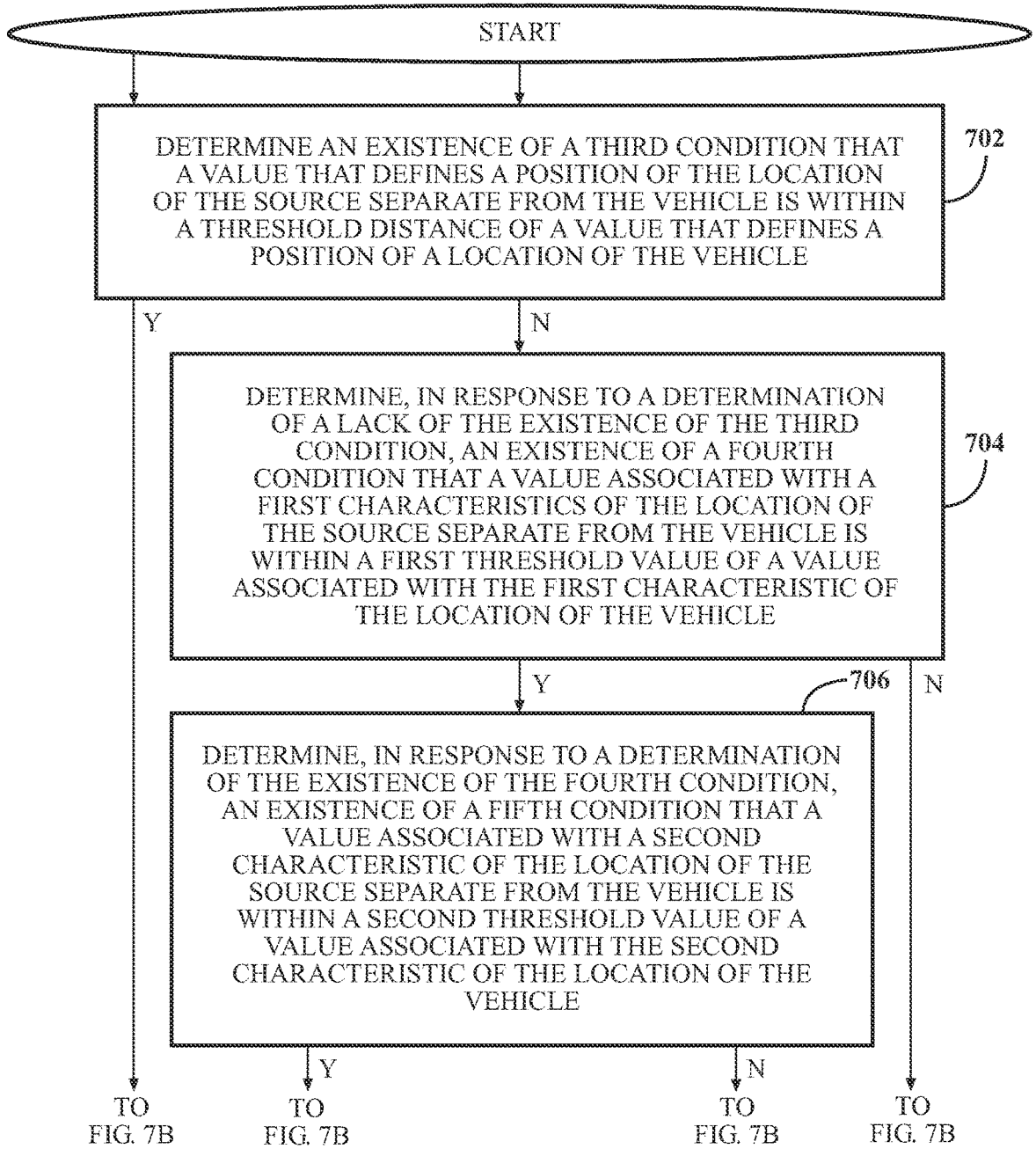
FIGS. 7A and 7B include a flow diagram that illustrates an example of a method that is associated with determining that a value associated with a characteristic of a location of a source separate from the vehicle is within a threshold value of a value associated with the characteristic of a location of the vehicle, according to the disclosed technologies.
Figure 7B:
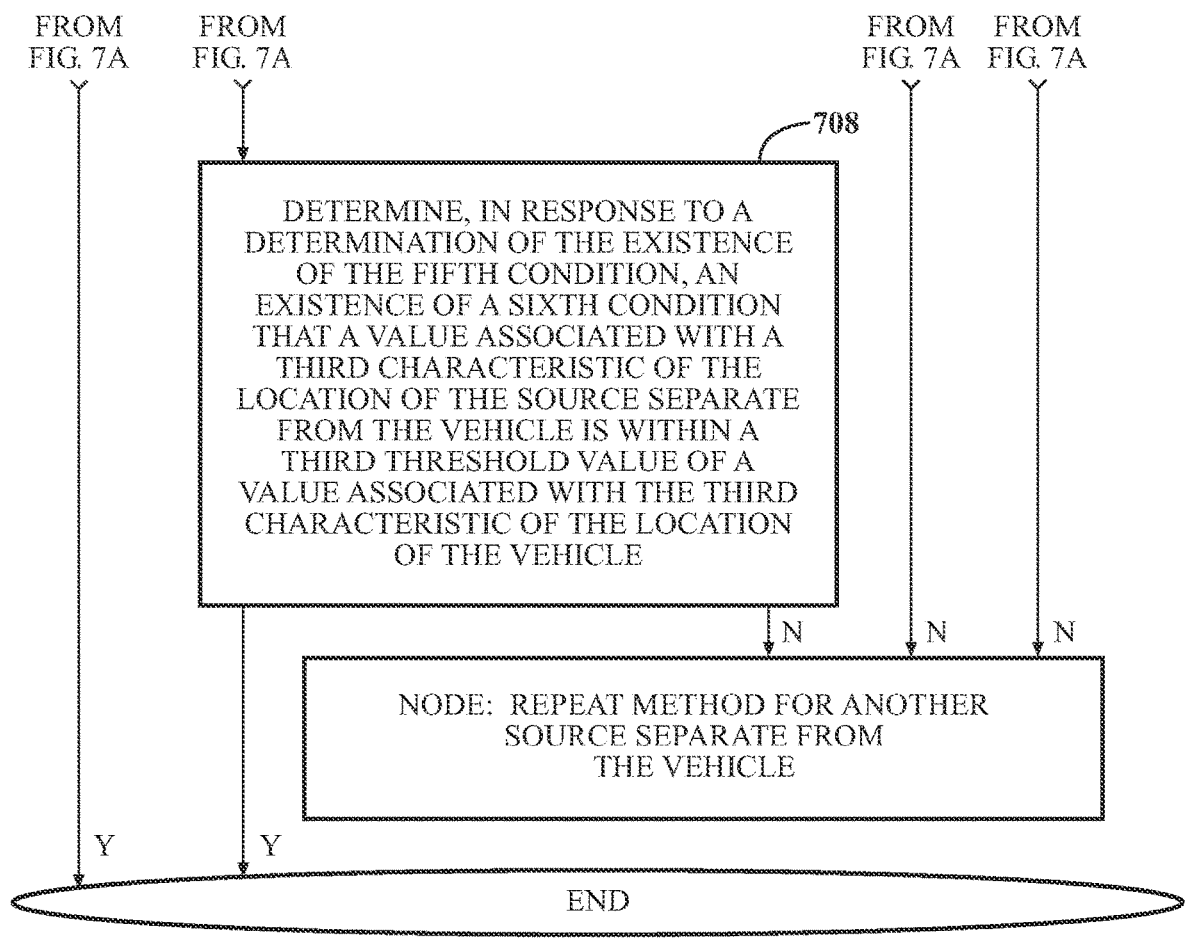

FIGS. 7A and 7B include a flow diagram that illustrates an example of a method 620 that is associated with determining that the value associated with the characteristic of the location of the source separate from the vehicle is within the threshold value of the value associated with the characteristic of the location of the vehicle, according to the disclosed technologies. The method 620 can be a specific configuration of this variation of this specific realization of the second implementation.

In FIG. 7A, in the method 620, at an operation 702, the location characteristic assessment module 214 can determine an existence of a third condition. The third condition can be that a value that defines a position of the location of the source separate from the vehicle is within a threshold distance of a value that defines the position of the location of the vehicle.

At an operation 704, the location characteristic assessment module 214 can determine, in response to a determination of a lack of the existence of the third condition, an existence of a fourth condition. The fourth condition can be that a value associated with a first characteristic of the location of the source separate from the vehicle is within a first threshold value of a value associated with the first characteristic of the location of the vehicle. For example, the first characteristic can be a weather history.

At an operation 706, the location characteristic assessment module 214 can determine, in response to a determination of the existence of the fourth condition, an existence of a fifth condition. The fifth condition can be that a value associated with a second characteristic of the location of the source separate from the vehicle is within a second threshold value of a value associated with the second characteristic of the location of the vehicle. For example, the second characteristic can be one or more of a type of a road (e.g., a highway), a regulation associated with the road, a speed limit associated with the regulation, a limitation on a direction of travel on the road associated with the regulation, a setting of the road (e.g., urban or rural), an intersection of the road with another road, a degree of curvature associated with the road, or the like. For example, the second characteristic can be a speed limit associated with a regulation associated with the road.

In FIG. 7B, in the method 620, at an operation 708, the location characteristic assessment module 214 can determine, in response to a determination of the existence of the fifth condition, an existence of a sixth condition. The sixth condition can be that a value associated with a third characteristic of the location of the source separate from the vehicle is within a third threshold value of a value associated with the third characteristic of the location of the vehicle. For example, the third characteristic can be a measure produced from processing an image of a road.

Figure 8:
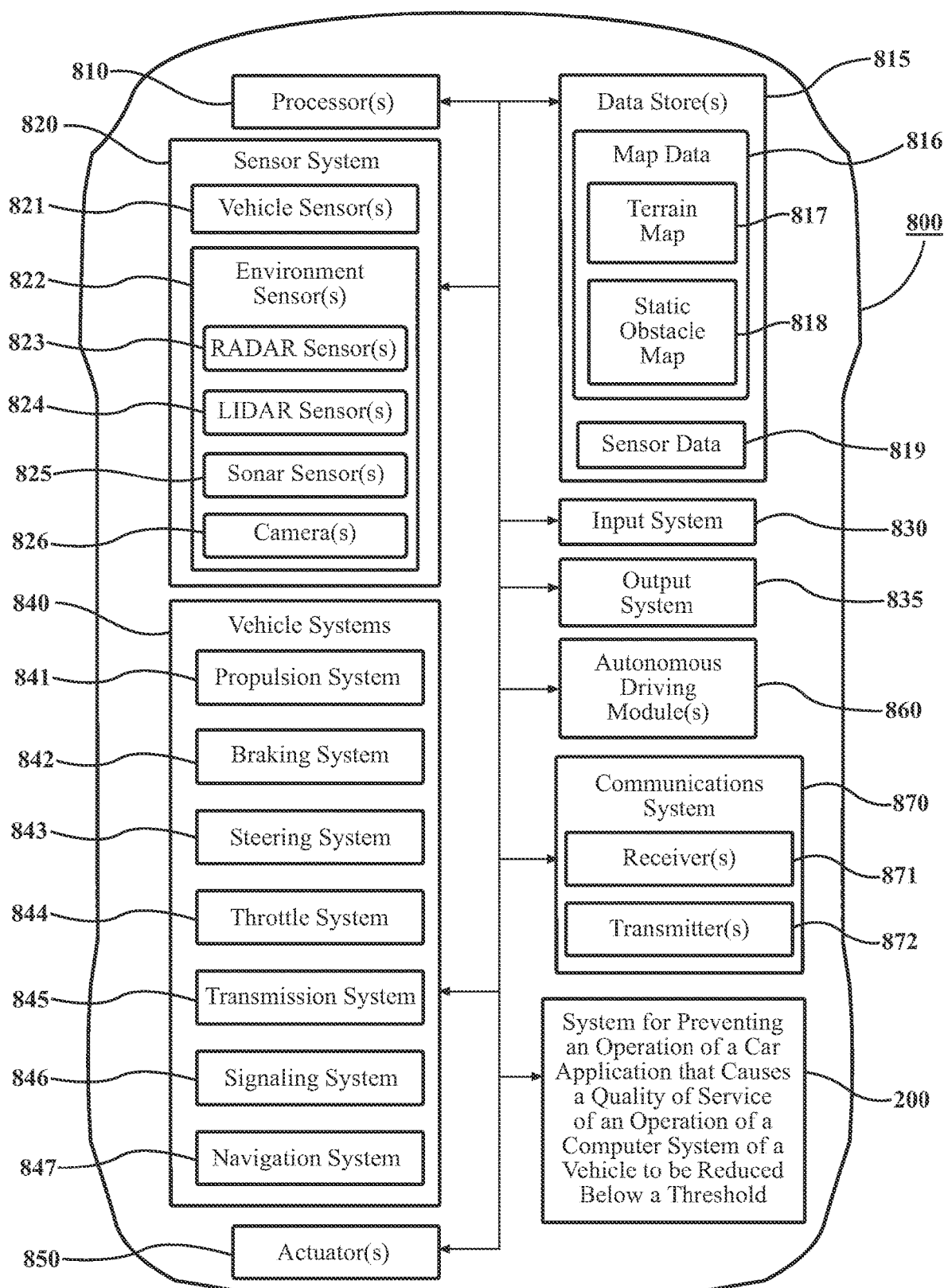
FIG. 8 includes a block diagram that illustrates an example of elements disposed on a vehicle, according to the disclosed technologies.

FIG. 8 includes a block diagram that illustrates an example of elements disposed on a vehicle 800, according to the disclosed technologies. As used herein, a "vehicle" can be any form of powered transport. In one or more implementations, the vehicle 800 can be an automobile. While arrangements described herein are with respect to automobiles, one of skill in the art understands, in light of the description herein, that embodiments are not limited to automobiles.

In some embodiments, the vehicle 800 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 800 is performed according to inputs received from a user (e.g., human driver). In one or more arrangements, the vehicle 800 can be a conventional vehicle that is configured to operate in only a manual mode.

In one or more embodiments, the vehicle 800 can be an automated vehicle. As used herein, "automated vehicle" can refer to a vehicle that operates in an automated mode. As used herein, "automated mode" can refer to navigating and/or maneuvering the vehicle 800 along a travel route using one or more computing systems to control the vehicle 800 with minimal or no input from a human driver. In one or more embodiments, the vehicle 800 can be highly automated or completely automated. In one embodiment, the vehicle 800 can be configured with one or more semi-automated operational modes in which one or more computing systems perform a portion of the navigation and/or maneuvering of the vehicle along a travel route, and a vehicle operator (i.e., driver) provides inputs to the vehicle 800 to perform a portion of the navigation and/or maneuvering of the vehicle 800 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 800 can include various elements. The vehicle 800 can have any combination of the various elements illustrated in FIG. 8. In various embodiments, it may not be necessary for the vehicle 800 to include all of the elements illustrated in FIG. 8. Furthermore, the vehicle 800 can have elements in addition to those illustrated in FIG. 8. While the various elements are illustrated in FIG. 8 as being located within the vehicle 800, one or more of these elements can be located external to the vehicle 800. Furthermore, the elements illustrated may be physically separated by large distances. For example, as described, one or more components of the disclosed system can be implemented within the vehicle 800 while other components of the system can be implemented within a cloud-computing environment, as described below. For example, the elements can include one or more processors 810, one or more data stores 815, a sensor system 820, an input system 830, an output system 835, vehicle systems 840, one or more actuators 850, one or more automated driving modules 860, a communications system 870, and the system 200 for preventing an operation of a car application that causes a quality of service of an operation of a computer system of a vehicle to be reduced below a threshold.

In one or more arrangements, the one or more processors 810 can be a main processor of the vehicle 800. For example, the one or more processors 810 can be an electronic control unit (ECU). For example, functions and/or operations of the processors of the computer system 104-a, the computer system 106-a, the computer system 108-a, and/or the computer system 110-a (illustrated in FIG. 1) can be realized by the one or more processors 810.

The one or more data stores 815 can store, for example, one or more types of data. For example, functions and/or operations of the memory of the computer system 104-a, the computer system 106-a, the computer system 108-a, and/or the computer system 110-a (illustrated in FIG. 1) can be realized by the one or more data stores 815. The one or more data store 815 can include volatile memory and/or non-volatile memory. Examples of suitable memory for the one or more data stores 815 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 815 can be a component of the one or more processors 810. Additionally or alternatively, the one or more data stores 815 can be operatively connected to the one or more processors 810 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 815 can store map data 816. The map data 816 can include maps of one or more geographic areas. In some instances, the map data 816 can include information or data on roads, traffic control devices, road markings, structures, features, and/or landmarks in the one or more geographic areas. The map data 816 can be in any suitable form. In some instances, the map data 816 can include aerial views of an area. In some instances, the map data 816 can include ground views of an area, including 360-degree ground views. The map data 816 can include measurements, dimensions, distances, and/or information for one or more items included in the map data 816 and/or relative to other items included in the map data 816. The map data 816 can include a digital map with information about road geometry. The map data 816 can be high quality and/or highly detailed.

In one or more arrangements, the map data 816 can include one or more terrain maps 817. The one or more terrain maps 817 can include information about the ground, terrain, roads, surfaces, and/or other features of one or more geographic areas. The one or more terrain maps 817 can include elevation data of the one or more geographic areas. The map data 816 can be high quality and/or highly detailed. The one or more terrain maps 817 can define one or more ground surfaces, which can include paved roads, unpaved roads, land, and other things that define a ground surface.

In one or more arrangements, the map data 816 can include one or more static obstacle maps 818. The one or more static obstacle maps 818 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 818 can have location data, size data, dimension data, material data, and/or other data associated with them. The one or more static obstacle maps 818 can include measurements, dimensions, distances, and/or information for one or more static obstacles. The one or more static obstacle maps 818 can be high quality and/or highly detailed. The one or more static obstacle maps 818 can be updated to reflect changes within a mapped area.

In one or more arrangements, the one or more data stores 815 can store sensor data 819. As used herein, "sensor data" can refer to any information about the sensors with which the vehicle 800 can be equipped including the capabilities of and other information about such sensors. The sensor data 819 can relate to one or more sensors of the sensor system 820. For example, in one or more arrangements, the sensor data 819 can include information about one or more lidar sensors 824 of the sensor system 820.

In some arrangements, at least a portion of the map data 816 and/or the sensor data 819 can be located in one or more data stores 815 that are located onboard the vehicle 800. Alternatively or additionally, at least a portion of the map data 816 and/or the sensor data 819 can be located in one or more data stores 815 that are located remotely from the vehicle 800.

The sensor system 820 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 820 includes a plurality of sensors, the sensors can work independently from each other. Alternatively, two or more of the sensors can work in combination with each other. In such a case, the two or more sensors can form a sensor network. The sensor system 820 and/or the one or more sensors can be operatively connected to the one or more processors 810, the one or more data stores 815, and/or another element of the vehicle 800 (including any of the elements illustrated in FIG. 8). The sensor system 820 can acquire data of at least a portion of the external environment of the vehicle 800 (e.g., nearby vehicles). The sensor system 820 can include any suitable type of sensor. Various examples of different types of sensors are described herein. However, one of skill in the art understands that the embodiments are not limited to the particular sensors described herein.

The sensor system 820 can include one or more vehicle sensors 821. The one or more vehicle sensors 821 can detect, determine, and/or sense information about the vehicle 800 itself. In one or more arrangements, the one or more vehicle sensors 821 can be configured to detect and/or sense position and orientation changes of the vehicle 800 such as, for example, based on inertial acceleration. In one or more arrangements, the one or more vehicle sensors 821 can include one or more accelerometers, one or more gyroscopes, an inertial measurement unit (IMU), a dead-reckoning system, a global navigation satellite system (GNSS), a global positioning system (GPS), a navigation system 847, and/or other suitable sensors. The one or more vehicle sensors 821 can be configured to detect and/or sense one or more characteristics of the vehicle 800. In one or more arrangements, the one or more vehicle sensors 821 can include a speedometer to determine a current speed of the vehicle 800.

Alternatively or additionally, the sensor system 820 can include one or more environment sensors 822 configured to acquire and/or sense driving environment data. As used herein, "driving environment data" can include data or information about the external environment in which a vehicle is located or one or more portions thereof. For example, the one or more environment sensors 822 can be configured to detect, quantify, and/or sense obstacles in at least a portion of the external environment of the vehicle 800 and/or information/data about such obstacles. Such obstacles may be stationary objects and/or dynamic objects. The one or more environment sensors 822 can be configured to detect, measure, quantify, and/or sense other things in the external environment of the vehicle 800 such as, for example, lane markers, signs, traffic lights, traffic signs, lane lines, crosswalks, curbs proximate the vehicle 800, off-road objects, etc.

Various examples of sensors of the sensor system 820 are described herein. The example sensors may be part of the one or more vehicle sensors 821 and/or the one or more environment sensors 822. However, one of skill in the art understands that the embodiments are not limited to the particular sensors described.

In one or more arrangement, the one or more environment sensors 822 can include one or more radar sensors 823, one or more lidar sensors 824, one or more sonar sensors 825, and/or one more cameras 826. In one or more arrangements, the one or more cameras 826 can be one or more high dynamic range (HDR) cameras or one or more infrared (IR) cameras. For example, the one or more cameras 826 can be used to record a reality of a state of an item of information that can appear in digital map. For example, functions and/or operations of the camera 104-*c*, the camera 106-*c*, the camera 108-*c*, and/or the camera 110-*c* (illustrated in FIG. 1) can be realized by the one or more cameras 826.

The input system 830 can include any device, component, system, element, arrangement, or groups thereof that enable information/data to be entered into a machine. The input system 830 can receive an input from a vehicle passenger (e.g., a driver or a passenger). The output system 835 can include any device, component, system, element, arrangement, or groups thereof that enable information/data to be presented to a vehicle passenger (e.g., a driver or a passenger).

Various examples of the one or more vehicle systems 840 are illustrated in FIG. 8. However, one of skill in the art understands that the vehicle 800 can include more, fewer, or different vehicle systems. Although particular vehicle systems can be separately defined, each or any of the systems or portions thereof may be otherwise combined or segregated via hardware and/or software within the vehicle 800. For example, the one or more vehicle systems 840 can include a propulsion system 841, a braking system 842, a steering system 843, a throttle system 844, a transmission system 845, a signaling system 846, and/or the navigation system 847. Each of these systems can include one or more devices, components, and/or a combination thereof, now known or later developed.

The navigation system 847 can include one or more devices, applications, and/or combinations thereof, now known or later developed, configured to determine the geographic location of the vehicle 800 and/or to determine a travel route for the vehicle 800. The navigation system 847 can include one or more mapping applications to determine a travel route for the vehicle 800. The navigation system 847 can include a global positioning system, a local positioning system, a geolocation system, and/or a combination thereof.

The one or more actuators 850 can be any element or combination of elements operable to modify, adjust, and/or alter one or more of the vehicle systems 840 or components thereof responsive to receiving signals or other inputs from the one or more processors 810 and/or the one or more automated driving modules 860. Any suitable actuator can be used. For example, the one or more actuators 850 can include motors, pneumatic actuators, hydraulic pistons, relays, solenoids, and/or piezoelectric actuators.

The one or more processors 810 and/or the one or more automated driving modules 860 can be operatively connected to communicate with the various vehicle systems 840 and/or individual components thereof. For example, the one or more processors 810 and/or the one or more automated driving modules 860 can be in communication to send and/or receive information from the various vehicle systems 840 to control the movement, speed, maneuvering, heading, direction, etc. of the vehicle 800. The one or more processors 810 and/or the one or more automated driving modules 860 may control some or all of these vehicle systems 840 and, thus, may be partially or fully automated.

The one or more processors 810 and/or the one or more automated driving modules 860 may be operable to control the navigation and/or maneuvering of the vehicle 800 by controlling one or more of the vehicle systems 840 and/or components thereof. For example, when operating in an automated mode, the one or more processors 810 and/or the one or more automated driving modules 860 can control the direction and/or speed of the vehicle 800. The one or more processors 810 and/or the one or more automated driving modules 860 can cause the vehicle 800 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 870 can include one or more receivers 871 and/or one or more transmitters 872. The communications system 870 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 870 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the wireless communications device 104-*b*, the wireless communications device 106-*b*, the wireless communications device 108-*b*, and/or the wireless communications device 110-*b* (illustrated in FIG. 1) can be realized by the communications system 870.

The vehicle 800 can include one or more modules, at least some of which are described herein. The modules can be implemented as computer-readable program code that, when executed by the one or more processors 810, implement one or more of the various processes described herein. One or more of the modules can be a component of the one or more processors 810. Alternatively or additionally, one or more of the modules can be executed on and/or distributed among other processing systems to which the one or more processors 810 can be operatively connected. The modules can include instructions (e.g., program logic) executable by the one or more processors 810. Alternatively or additionally, the one or more data store 815 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 800 can include one or more automated driving modules 860. The one or more automated driving modules 860 can be configured to receive data from the sensor system 820 and/or any other type of system capable of capturing information relating to the vehicle 800 and/or the external environment of the vehicle 800. In one or more arrangements, the one or more automated driving modules 860 can use such data to generate one or more driving scene models. The one or more automated driving modules 860 can determine position and velocity of the vehicle 800. The one or more automated driving modules 860 can determine the location of obstacles, obstacles, or other environmental features including traffic signs, trees, shrubs, neighboring vehicles, pedestrians, etc.

The one or more automated driving modules 860 can be configured to receive and/or determine location information for obstacles within the external environment of the vehicle 800 for use by the one or more processors 810 and/or one or more of the modules described herein to estimate position and orientation of the vehicle 800, vehicle position in global coordinates based on signals from a plurality of satellites, or any other data and/or signals that could be used to determine the current state of the vehicle 800 or determine the position of the vehicle 800 with respect to its environment for use in either creating a map or determining the position of the vehicle 800 in respect to map data.

The one or more automated driving modules 860 can be configured to determine one or more travel paths, current automated driving maneuvers for the vehicle 800, future automated driving maneuvers and/or modifications to current automated driving maneuvers based on data acquired by the sensor system 820, driving scene models, and/or data from any other suitable source such as determinations from the sensor data 819. As used herein, "driving maneuver" can refer to one or more actions that affect the movement of a vehicle. Examples of driving maneuvers include: accelerating, decelerating, braking, turning, moving in a lateral direction of the vehicle 800, changing travel lanes, merging into a travel lane, and/or reversing, just to name a few possibilities. The one or more automated driving modules 860 can be configured to implement determined driving maneuvers. The one or more automated driving modules 860 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 860 can be configured to execute various vehicle functions and/or to transmit data to, receive data from, interact with, and/or control the vehicle 800 or one or more systems thereof (e.g., one or more of vehicle systems 840). For example, functions and/or operations of an automotive navigation system can be realized by the one or more automated driving modules 860.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, 6A-6C, 7A, 7B, and 8, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for preventing an operation of a car application that causes, during the operation of the car application in conjunction with an operation of a computer system of a vehicle, a quality of service of the operation of the computer system to be reduced below a threshold, the system comprising:
one or more processors configured to receive, from a source separate from the vehicle, a value indicative of the quality of service of the operation of the computer system of the vehicle during the operation of the car application in conjunction with the operation of the computer system; and
a memory communicably coupled to the one or more processors and storing:
a quality of service assessment module including instructions that when executed by the one or more processors cause the one or more processors to determine an existence of a first condition, the first condition being that the value is less than the threshold;
a location characteristic assessment module including instructions that when executed by the one or more processors cause the one or more processors to determine an existence of a second condition, the second condition being that a value that defines a position of a location of the source separate from the vehicle is within a threshold distance of a value that defines a position of a location of the vehicle; and
an actuation module including instructions that when executed by the one or more processors cause the one or more processors to:
cause, in response to a determination of a lack of the existence of the first condition and a determination of the existence of the second condition, the car application to be in a condition to be operated on the vehicle; and
prevent, in response to a determination of the existence of the first condition and a determination of a lack of the existence of the second condition, the car application from being in the condition to be operated on the vehicle.

2. The system of claim 1, wherein the car application is configured to produce information related to an object detected in a vicinity of the vehicle.

3. The system of claim 1, wherein:
the computer system of the vehicle was installed in the vehicle prior to an initial sale of the vehicle, and
the computer system is configured to control an operation of the vehicle that effects a safety of the vehicle.

4. The system of claim 1, wherein the one or more processors are further configured to receive, from the vehicle, a request, the request being for at least the car application or for a signal to cause the car application to be in the condition to be operated on the vehicle.

5. The system of claim 4, wherein:
the memory further stores an interface assessment module including instructions that when executed by the one or more processors cause the one or more processors to determine an existence of a third condition, the third condition being that an interface of the computer system of the vehicle supports the operation of the car application,
the request includes information about the interface of the computer system of the vehicle, and the instructions of the actuation module cause the one or more processors to:
- cause, in response to the determination of the lack of the existence of the first condition, the determination of the existence of the second condition, and the determination of the existence of the third condition, the car application to be in the condition to be operated on the vehicle; and
- prevent, in response to at least one of the determination of the existence of the first condition and the determination of the lack of the existence of the second condition, or a determination of the lack of the existence of the third condition, the car application from being in the condition to be operated on the vehicle.

6. The system of claim 5, wherein the interface of the computer system is an interface of the computer system installed at a time earlier than a current interface of the computer system.

7. The system of claim 5, wherein the location characteristic assessment module further includes instructions to determine that a value associated with a characteristic of the location of the source separate from the vehicle is within a threshold value of a value associated with the characteristic of the location of the vehicle, wherein the request further includes the value associated with the characteristic of the location of the vehicle.

8. The system of claim 7, wherein the characteristic is associated with at least one of a weather history, a condition of a road surface marking, a type of a road, a regulation associated with the road, a speed limit associated with the regulation, a limitation on a direction of travel on the road associated with the regulation, a setting of the road, an intersection of the road with another road, a degree of curvature associated with the road, a measure produced from processing an image of the road, or an availability of a type of communications.

9. The system of claim 7, wherein the instructions of the location characteristic assessment module cause the one or more processors to:
- determine, in response to the determination of the lack of the existence of the second condition, an existence of a fourth condition, the fourth condition being that a value associated with a first characteristic of the location of the source separate from the vehicle is within a first threshold value of a value associated with the first characteristic of the location of the vehicle;
- determine, in response to a determination of the existence of the fourth condition, an existence of a fifth condition, the fifth condition being that a value associated with a second characteristic of the location of the source separate from the vehicle is within a second threshold value of a value associated with the second characteristic of the location of the vehicle; and
- determine, in response to a determination of the existence of the fifth condition, an existence of a sixth condition, the sixth condition being that a value associated with a third characteristic of the location of the source separate from the vehicle is within a third threshold value of a value associated with the third characteristic of the location of the vehicle.

10. The system of claim 9, wherein:
the first characteristic is a weather history,
the second characteristic is at least one of a type of a road, a regulation associated with the road, a speed limit associated with the regulation, a limitation on a direction of travel on the road associated with the regulation, a setting of the road, an intersection of the road with another road, or a degree of curvature associated with the road, and
the third characteristic is a measure produced from processing an image of the road.

11. The system of claim 1, wherein:
the one or more processors are further configured to receive, from another source separate from the vehicle, another value indicative of the quality of service of the operation of the computer system of the vehicle during the operation of the car application in conjunction with the operation of the computer system, and
the memory further stores a timeliness assessment module including instructions that when executed by the one or more processors cause the one or more processors to determine that the value indicative of the quality of service of the operation of the computer system of the vehicle during the operation of the car application in conjunction with the operation of the computer system was produced at a time later than another time at which the other value indicative of the quality of service of the operation of the computer system of the vehicle during the operation of the car application in conjunction with the operation of the computer system was produced.

12. The system of claim 1, wherein the instructions of the actuation module cause the one or more processors to at least one of cause the car application to be downloaded to the vehicle or transmit, to the vehicle, a signal that is configured to cause the car application to be in the condition to be operated on the vehicle.

13. The system of claim 12 wherein the instructions of the actuation module cause the one or more processors to cause the car application to be downloaded from a first cloud computing platform to the vehicle.

14. The system of claim 13, wherein the one or more processors are disposed in one of a second cloud computing platform or the first cloud computing platform.

15. The system of claim 1, wherein the instructions of the actuation module cause the one or more processors to at least one of prevent the car application from being downloaded to the vehicle or prevent a transmission, to the vehicle, of a signal that is configured to cause the car application to be in the condition to be operated on the vehicle.

16. The system of claim 1, wherein the instructions of the actuation module further cause the one or more processors to cause, in response to the determination of the existence of the first condition, a warning signal to be transmitted to at least one of the vehicle or an electronic device of an operator of the vehicle.

17. A method for preventing an operation of a car application that causes, during the operation of the car application in conjunction with an operation of a computer system of a vehicle, a quality of service of the operation of the computer system to be reduced below a threshold, the method comprising:
- receiving, by a processor and from a source separate from the vehicle, a value indicative of the quality of service of the operation of the computer system of the vehicle during the operation of the car application in conjunction with the operation of the computer system;
- determining, by the processor, an existence of a first condition, the first condition being that the value is less than the threshold;
- determining, by the processor, an existence of a second condition, the second condition being that a value that defines a position of a location of the source separate from the vehicle is within a threshold distance of a value that defines a position of a location of the vehicle;

causing, by the processor and in response to a determination of a lack of the existence of the first condition and a determination of the existence of the second condition, the car application to be in a condition to be operated on the vehicle; and preventing, by the processor and in response to a determination of the existence of the first condition and a determination of a lack of the existence of the second condition, the car application from being in the condition to be operated on the vehicle.

18. The method of claim 17, wherein the source separate from the vehicle comprises at least one of a different vehicle or a first cloud computing platform.

19. The method of claim 18, wherein the processor is disposed in one of a second cloud computing platform or the first cloud computing platform.

20. A non-transitory computer-readable medium for preventing an operation of a car application that causes, during the operation of the car application in conjunction with an operation of a computer system of a vehicle, a quality of service of the operation of the computer system to be reduced below a threshold, the non-transitory computer-readable medium including instructions that when executed by one or more processors cause the one or more processors to:

receive, from a source separate from the vehicle, a value indicative of the quality of service of the operation of the computer system of the vehicle during the operation of the car application in conjunction with the operation of the computer system;

determine an existence of a first condition, the first condition being that the value is less than the the threshold;

determining an existence of a second condition, the second condition being that a value that defines a position of a location of the source separate from the vehicle is within a threshold distance of a value that defines a position of a location of the vehicle;

cause, in response to a determination of a lack of the existence of the first condition and a determination of the existence of the second condition, the car application to be in a condition to be operated on the vehicle; and prevent, in response to a determination of the existence of the first condition and a determination of a lack of the existence of the second condition, the car application from being in the condition to be operated on the vehicle.

* * * * *